D. Bruce,
Treating Offal.
No. 110,627.      Patented Jan. 3, 1871.
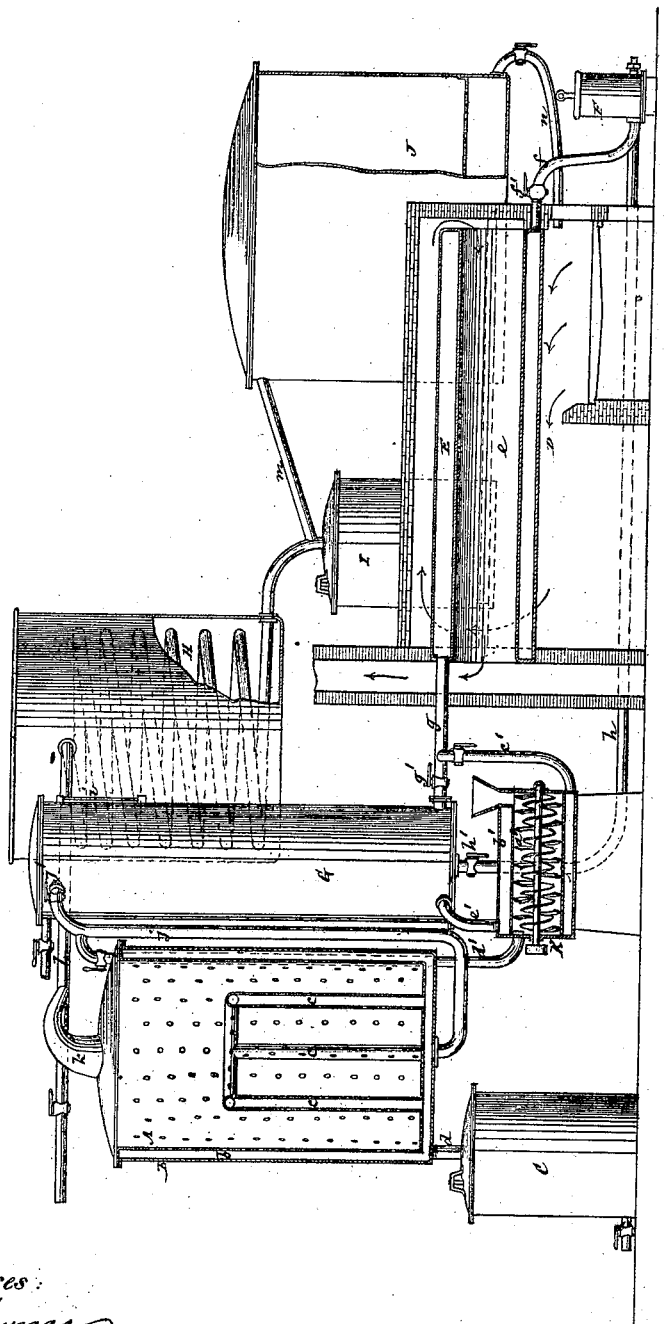
Witnesses:
Fred Haynes
R. J. ...
Inventor:
Duncan Bruce

United States Patent Office.

DUNCAN BRUCE, OF BROOKLYN, NEW YORK, ASSIGNOR TO EMMA BRUCE OF SAME PLACE.

Letters Patent No. 110,627, dated January 3, 1871.

IMPROVEMENT IN RENDERING AND TREATING OFFAL AND OTHER ANIMAL SUBSTANCES.

The Schedule referred to in these Letters Patent and making part of the same.

To all whom it may concern:

Be it known that I, DUNCAN BRUCE, of Brooklyn, in the county of Kings and State of New York, have invented certain new and useful Improvements in the Treatment of Animal and other Matters for the purposes of extracting of the fat or oil therefrom and utilizing the residuum, of which the following is a full, clear, and exact description, reference being had to the accompanying drawing forming part of this specification, and which represents a partly sectional vertical view or elevation of an apparatus constructed in accordance with my invention.

My invention relates mainly to the rendering of raw tallow or fat, and to the treatment of various animal substances or refuse, including animal carcasses, offal, and fish, for obtaining fat, oil, and various products therefrom, and for utilizing the residue without permitting the evolution of injurious or offensive odors, either during the process of treatment or from the product or residue. In said invention, although superheated steam may be used, I prefer to employ hot air, which permeates in a more certain and efficient manner than steam the mass to be treated, and the invention will here be described with reference to the use of heated air.

In carrying out my invention, I use as the means of applying the necessary heat for the extraction of the fat or oil, and the drying of the residuum, either heated air or superheated steam introduced at a suitable pressure directly among the matters to be treated.

The invention relates to the smoking of the dried residuum within the boiler or rendering-vessel, for the purpose of preventing or arresting decomposition; and consists in the arrangement, between the air or steam-heater and the boiler or reducing-vessel in which the rendering and drying are performed, of a smoke-generator, in which smoke is generated from saw-dust or other suitable material, by causing heated air to pass from said heater or reducing-vessel through said generator.

Referring to the accompanying drawing—

A and B represent two vessels or chambers, the one arranged within the other, and constituting what may be termed a double boiler or reducing-vessel.

The inner one, A, of these vessels, is insulated from the outer vessel B by a space, b, arranged to extend around and beneath it, for the free circulation therein of the heated air used in reducing the substance under treatment, and to facilitate its penetration of the mass through perforations made in the sides and bottom of the inner vessel, and through or by means of perforated tubes, c c, arranged to extend up into the inner vessel A among the mass or substance under treatment therein. Said mass, if raw tallow or lard, will, as soon as thus heated, melt and run down the tubes c c, and down within the space b, and through a connecting-pipe, d, into a receiver, C, from whence it can be drawn off into any other receiver without stopping or interfering with the continuity of the trying or reducing process.

A somewhat different construction of trying or reducing-vessel may, if desired, be used by, instead of using a perforated inner vessel extending the whole depth of the outer one to hold the matter under treatment, merely using a perforated lining within a contracted lower portion of the outer vessel, said perforated lining resting by projections within the outer vessel, which it fits so as to leave a space for the heated air around it to enter and permeate the mass for the purpose, as in the case of the double boiler A B, of facilitating the cooking and drying and assisting in drawing off the grease, tallow, lard or moisture from the animal substances in the boiler; or, when the apparatus is used for rendering, for running off the melted tallow or lard, a suitable discharge-pipe being connected with the bottom of the boiler.

When the material treated is animal matter, such as carcasses or fish offal, the grease or oil can be removed by employing a series of boilers and pumping the fluid portion from the one boiler into another until the grease or oil, which floats on the top, passes out at the discharge-pipe; or it may be otherwise collected, and the water or animal-juice be separately collected, if desired, to utilize the ammonia or gelatine it contains.

D is the furnace for heating the air to be introduced within the mass under treatment.

Said furnace, which is supplied with a return flue, e, operates to heat both internally and externally an annular heater, E, which is supplied with air, as required, by a pump, F, through a pipe, f, and stop or regulating-cock, f''.

The hot air is taken from this heater E by a pipe, g, which is fitted with a valve or cock, g', into an "attemperator," G, a cold-air pipe, h, having a regulating-valve, h', being also connected with the pump, and whereby the temperature of the heated air may be regulated in the attemperator as a general receiver or reservoir before it is introduced to the trying-chamber or boiler, to effect the necessary reduction of the mass in the latter without burning or injuring the residue.

To determine the proper temperature, said attemperator is provided with a thermometer, i.

The heated air, thus tempered, passes by a pipe, j, from the upper portion of the attemperator to the bottom of the outer vessel B of the boiler, said pipe j being provided with a valve, j', to shut off or regulate the supply.

An extra pressure or force of air may be admitted into the boiler when the fat or grease is nearly all drawn off, to press the remainder out of the scrap.

The vapors rising from the boiler are conducted, by a goose-neck, $k$, and pipe $l$, into a condenser, H, fitted with a worm, and from which the condensed portion of said vapors passes off into a receiver, I, where it is collected for future use, while the remaining or uncondensed gases pass, by a pipe, $m$, into a purifier, J, which may be of the ordinary construction used in purifying gases, the same being fitted with a perforated false bottom, on which is placed charcoal, lime, or other purifying substance, through which the gases pass, and afterward are conducted, by a pipe, $n$, into the furnace, where they are burnt or dispersed, thereby doing away with the evolution of injurious and offensive odors.

After the animal or fishy matter has been treated as described, in the boiler, the scrap or residue is smoked, and may be kept for any length of time perfectly sweet and inoffensive, to be used as or worked up into manure by passing it from the boiler into a mill of any suitable description, and whereby it (bones, if any, included,) is disintegrated or reduced to a powder. Said residue, instead of being used for manure, may be employed for making gelatine, or any other purpose to which it is adapted.

When necessary to smoke the scrap, the same is effected by means of a smoke-generating apparatus, K, that may be filled with saw-dust or other charring substances, preferably kept in motion while being charred. Said apparatus may be variously constructed, but, as here shown, its charring-chamber $a'$ is surrounded by a heating-space or jacket, $b'$, into which hot air, when required, is conducted by a branch, $c'$, from the heater-pipe $g$, and the smoke, as generated, is passed by a pipe, $d'$, to the pipe $j$, by which, when the cock $j'$ is closed, the smoke is passed into the boiler.

The connection of the pipe $d'$ with the pipe $j$ is made at a suitable elevation above the level of the mass in the boiler, whereby matter is prevented from passing out of the boiler into the smoker. After the scrap has been properly smoked, hot air is introduced from the attemperator into the boiler to dry the mass.

A pipe, $e'$, serves to carry off all surplus or waste heat from the smoke-generating apparatus K into the attemperator.

Any number of boilers, provided with suitable connections and stop-cocks, may be used in the same apparatus, and whereby smoking may be going on in one boiler while reducing or trying the mass is proceeding in another.

When superheated steam is used in the place of heated air, then the pump F may be dispensed with; but the attemperator G is retained for operation between the heater and boiler or reducing-vessel, as before.

What is here claimed, and desired to be secured by Letters Patent, is—

The smoke-generator, arranged between the heater and the boiler or reducing-vessel, and heated by hot air or superheated steam from the heater, substantially as herein described.

DUNCAN BRUCE.

Witnesses:
FRED. HAYNES,
R. E. RABEAU.